Feb. 10, 1953 E. C. MOSS 2,627,664
GAUGE FOR CHECKING PARTS IN CYLINDRICAL ARTICLES
Filed July 10, 1946 4 Sheets-Sheet 1

INVENTOR
E.C. MOSS
BY
W.C. Parnell
ATTORNEY

Feb. 10, 1953 — E. C. MOSS — 2,627,664
GAUGE FOR CHECKING PARTS IN CYLINDRICAL ARTICLES
Filed July 10, 1946 — 4 Sheets-Sheet 2

INVENTOR
E.C. MOSS

Feb. 10, 1953 E. C. MOSS 2,627,664
GAUGE FOR CHECKING PARTS IN CYLINDRICAL ARTICLES
Filed July 10, 1946 4 Sheets-Sheet 3

INVENTOR
E.C. MOSS
BY
W.C. Parnell
ATTORNEY

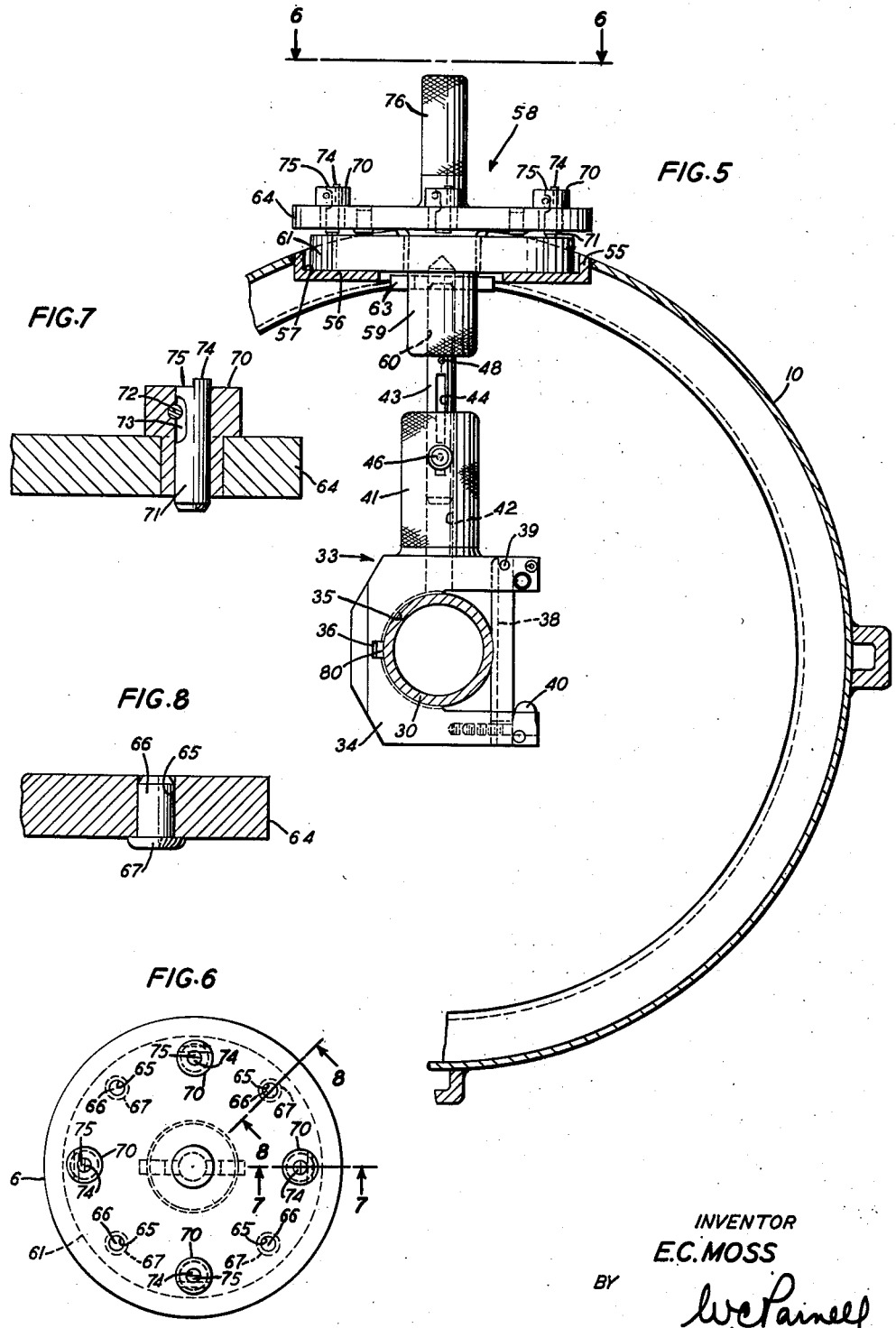

Patented Feb. 10, 1953

2,627,664

UNITED STATES PATENT OFFICE 2,627,664

GAUGE FOR CHECKING PARTS IN CYLINDRICAL ARTICLES

Earl C. Moss, Westfield, N. J., assignor to Western Electric Company, Incorporated, New York, N. Y., a corporation of New York Application July 10, 1946, Serial No. 682,676

7 Claims. (Cl. 33—180)

This invention relates to gages and more particularly to gages for checking the positions of apertured parts mounted on the peripheries of cylindrical articles with respect to given positions radially of the centerlines of the articles.

In the manufacture of various kinds of apparatus and equipment, it is necessary to check the relationship of various parts with respect to given positions in articles in which they are mounted. When the parts are to function efficiently with units or other structures to be connected thereto and assembled in the article, the mounting of these parts within predetermined limits of given positions is important. When the common forms of gaging apparatus are not suitable for such purposes, the development of new forms of gages is essential.

An object of the invention is to provide a gage which is simple in structure and highly efficient for checking the position of an apertured part, secured to the inner periphery of a cylindrical article, with respect to a given position radially of the centerline of the article.

In the present embodiment of the invention, two species of the gage are illustrated. Each species includes an outer unit (near the periphery of the article) for mounting in the aperture of the part which is secured to the inner periphry of a cylindrical article in alignment with an aperture in the article, and having an inwardly extending portion with an aperture therein positioned with its centerline identical with the centerline of the aperture in the part. A support is mounted within the article with its centerline coincident with the centerline of the article and an inner unit movably disposed on the support and including a gage bar which is movable radially of the support and article and receivable in the aperture of the said portion of the outer unit to indicate whether or not the aperture of the part is within predetermined limits of a given position radially of the centerline of the article.

In one of the species of the invention the outer unit mounted in the aperture of the part includes a projection, a portion of which is threaded to receive a washer-like member and a threaded element to secure the unit in the aligned apertures of the part and the article. One of the functions of this unit is to check the distance between a surface of an enlarged portion of the aperture and the periphery of the article or the outer edge of the opening therein. This is accomplished by a notch of a given depth and width in the outer portion of the threaded projection cooperating with an outer surface of the threaded element to indicate whether or not the said surface is within predetermined limits of the given position.

The other species of the invention includes an annular member of the outer unit and cooperating gage elements mounted at spaced positions in a disk-like portion of the unit to indicate whether or not the centerline of the part is within given limits of the selected position. This outer unit also gages the distance of a surface of the part with respect to the periphery of the article. The inner units in each species are identical and perform similar functions.

Other objects and advantages will be apparent from the following detailed description when considered in conjunction with the accompanying drawings, wherein:

Fig. 5 is a front elevational view of the other species of the invention, portions thereof being shown in section;

Fig. 6 is a top plan view of the unit taken along the line 6—6 of Fig. 5;

Fig. 7 is an enlarged fragmentary sectional view taken along the line 7—7 of Fig. 6; and Fig. 8 is an enlarged fragmentary sectional view taken along the line 8—8 of Fig. 6.

Figure 1:
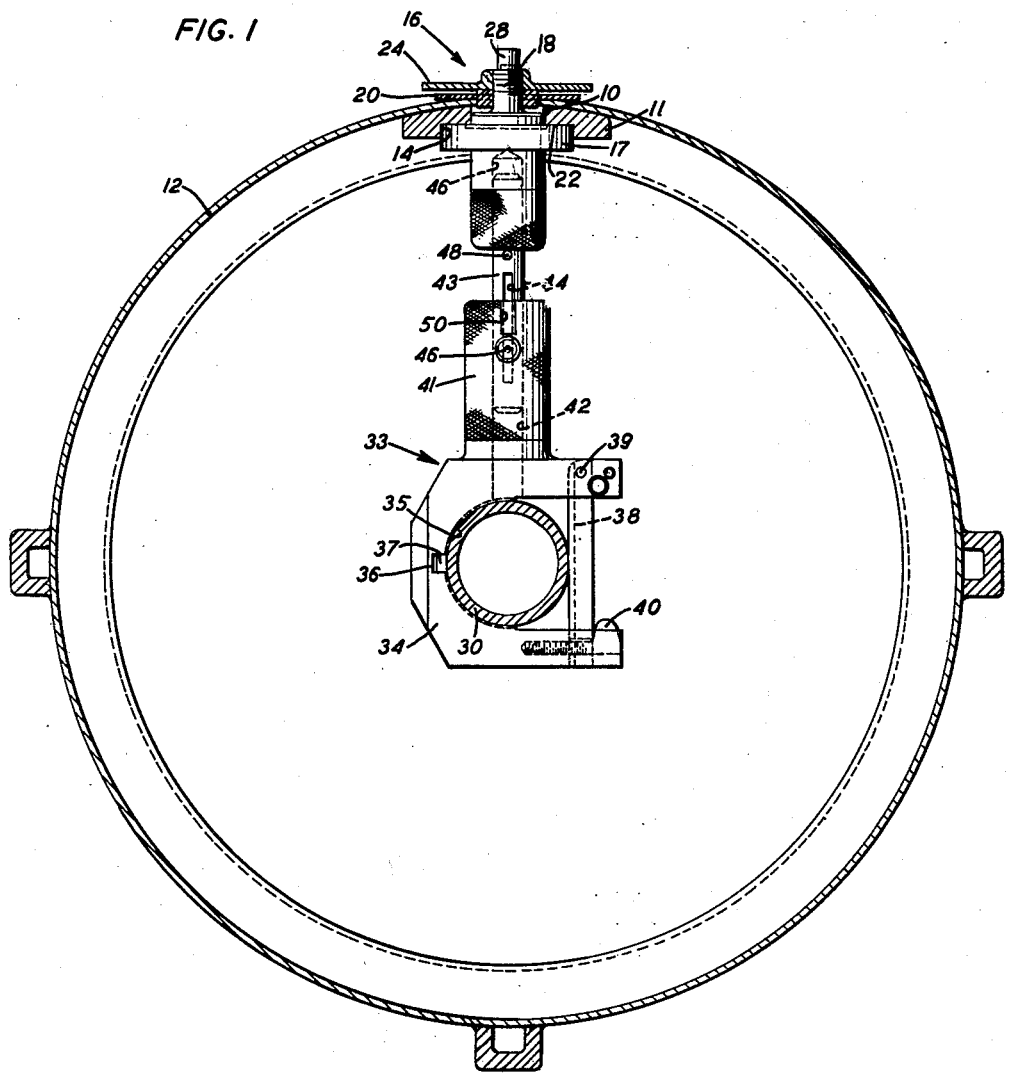
Fig. 1 is a front elevational view of one species of the gage shown in position in an article to gage a part.

Referring now to the drawings, attention is first directed to Figs. 1 to 4, inclusive. In this embodiment of the invention, the location of the centerline of an aperture 10 in a part 11 mounted on the inner periphery of a cylindrical article 12 with respect to the centerline of the article is one of the features to be checked by the gage. The aperture 10 of the part 11 has an enlarged portion or recess 14, its centerline also being coincident with the centerline of the aperture 15 of the article 12. The gage in this embodiment includes an outer unit indicated generally at 16 and including a body 17 formed to be received in both portions of the aperture 10, that is, the smaller portion of the aperture 10 and the enlarged portion or recess 14. A reduced threaded portion 18 of the body 17 receives an annular element 20 with an enlarged central portion 21 receivable in the aperture 15 of the article 12. The annular element 20 rests on the outer edge of the aperture 15 and through this structure it is possible to check the distance between the inner surface 22 in the aperture 10 of the part and the outer edge of the aperture 15 or periphery of the article. A threaded member or nut 24 is receivable on the threaded portion 18 and may be rotatably driven thereon manually a distance limited by the element 20 and the enlarged portion of the body 17 disposed in the recess 14. The outer surface 26 of the element 24 cooperates with a notch 27 in a reduced portion 28 of the body 17 to indicate the results of the first gaging operation. If the surface 26 lies in a plane within the notch 27, the location of this portion of the part 11, that is, the distance between the surface 22 and the periphery of the article, is satisfactory. The part 11 may be machined within fine limits prior to the time it is mounted in the article, yet errors may occur during the process of mounting the part which might render it unsatisfactory. These conditions are checked by the unit 16 during the first step of the gaging process.

Figure 2:
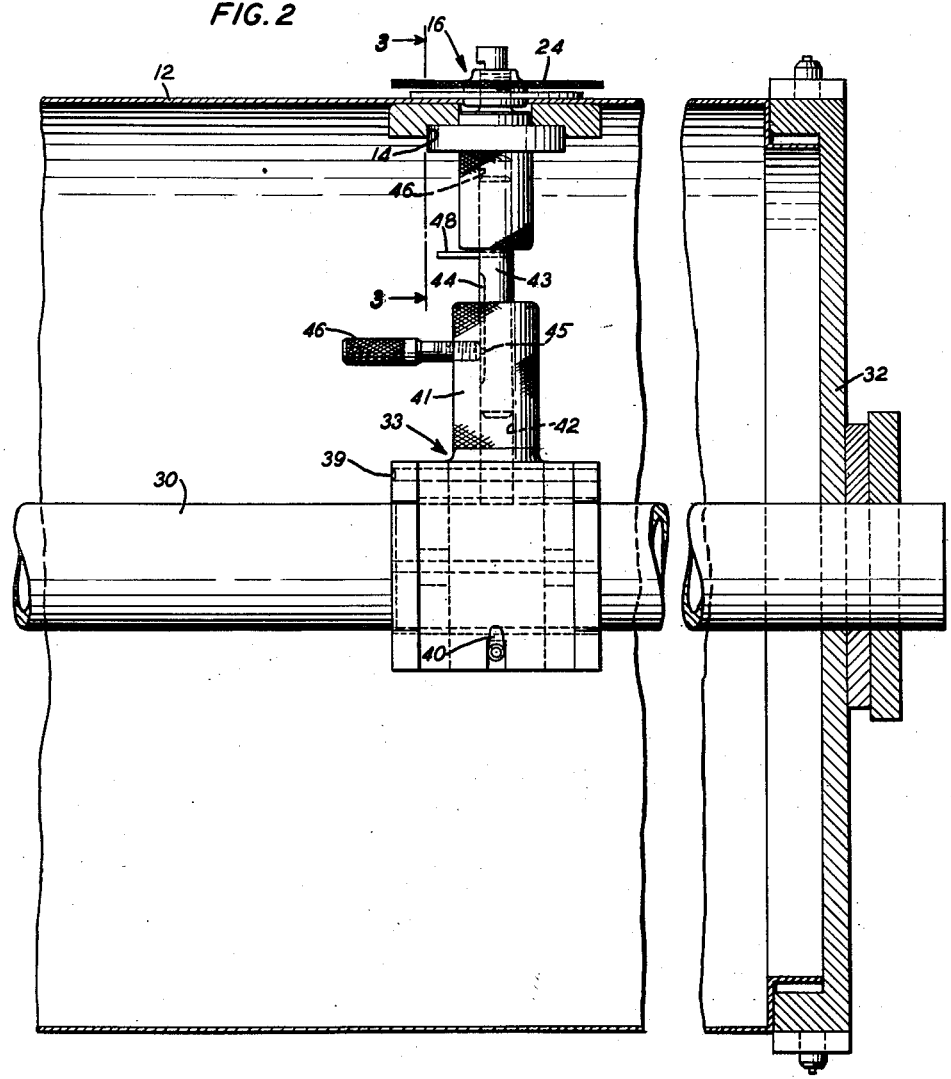
Fig. 2 is a vertical sectional view of the structure shown in Fig. 1.

The next step of the gaging method includes checking the centerline of the aperture 10 to determine whether or not it is within predetermined limits of a given radial position with respect to the centerline of the article. This is accomplished through the aid of a support 30 in the form of a hollow shaft centrally mounted in the article through the aid of mounting heads 32, only one of which is shown in Fig. 2. An inner unit 33 has a U-shaped member 34 with a concaved inner surface 35 partially conforming to the support 30, a notch 36 near the center of the surface receiving a lug or projection 37 integral with the support to guide the carriage in its movement axially of the support. A gate 38 pivotally supported at 39 between projections of one leg of the member 34 serves in securing the inner unit on the support. The gate 38 is removably held in place by a latch 40, the threaded shank of which is disposed in a threaded aperture of the lower leg of the member 34.

An integral sleeve 41 of the member 34 is centrally apertured at 42 perpendicular to the centerline of the support 30 and the article 12. A bar 43 slidably disposed in the aperture 42 has a longitudinal groove 44 therein cooperating with a reduced portion 45 of a locking screw 46 serving to hold the bar for axial movement only and to lock the bar in any given position. The bar 43 is receivable in an aperture 46 of the body 17 if the centerline of the aperture 10 is within predetermined limits of a given radial position with respect to the centerline of the article. The bar 43 may be moved axially through the aid of a handle 48 mounted on the bar. The variations in the diameters of the bar and the aperture 46 will allow for the limitations of the part, or the centerline thereof, with respect to the said given radial position. A longitudinal slot 50 is formed in the upper portion of the sleeve 41 to receive the pin 48 so that the bar 43 may be lowered into the aperture 42 a distance sufficient for the removal of the bar from the aperture 46 of the upper unit 16.

Figure 3:
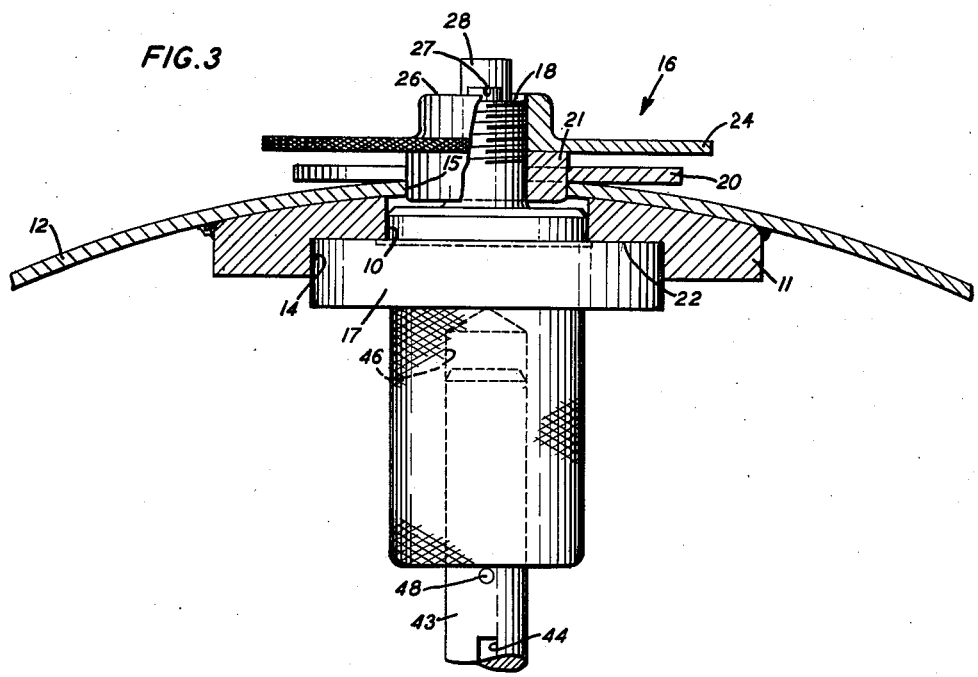
Fig. 3 is an enlarged fragmentary sectional view taken substantially along the line 3—3 of Fig. 2.
Figure 4:
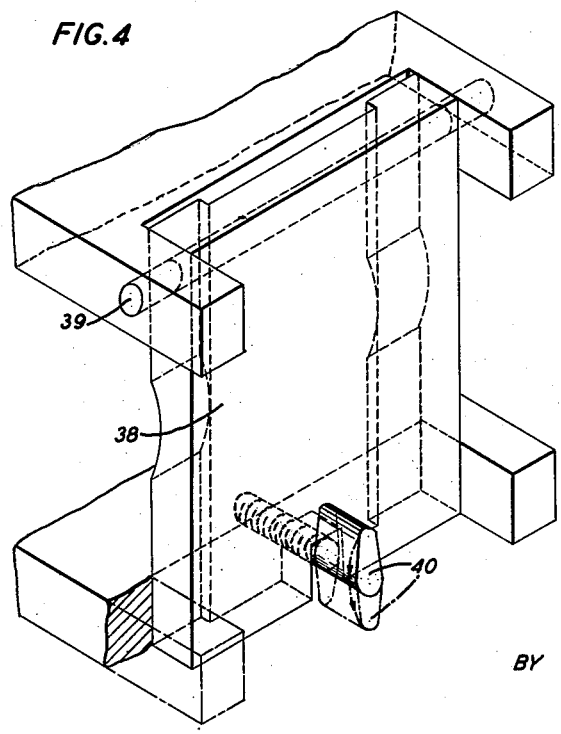
Fig. 4 is an enlarged fragmentary perspective view of a portion of the inner unit or carriage.

The gage shown in Figs. 1 to 4, inclusive, is formed of separate units which may be handled more easily than a unitary structure, the first gaging operation being simplified by the utilization of only the unit 16. To perform the first gaging operation, the unit 33 with its bar 43 is positioned out of the way on the support or shaft 30. If desired, it may be turned about the shaft when moved out of registration with the lug 37 to give the operator more room within the article to assemble the unit 16. The various portions of the unit 16 are separate and at this time the body 17 may be inserted in place within the apertures 10 and 15 and held in this position while the element 20 is lowered over the threaded portion 18 and positioned as illustrated in Fig. 3, the enlarged central portion 17 extending into the aperture 15 of the article. The element 24 is then placed on the threaded portion 18 and rotated as far as possible, that is, until it is stopped by the element 20 and the portion 17 terminating their movement toward each other. At this time the operator observes the location of the surface 26 with respect to the notch 27. If the surface 26 lies within the area of the notch, the first requirement for the part 10 has been met.

The unit 33 is then moved into position to cause the notch 36 to register with the projection 37 after which the carriage is moved axially of the shaft until the bar 43 is in general alignment with the aperture 46. The operator, through the aid of the handle 48, moves the bar upwardly and if the bar is received in the aperture 46 the next requirement for the part 11 has been met. Through these tests, the operator is assured that the surface 22 of the part 11 is within given limits of a required distance from the periphery of the article or the outer edge of the aperture 15. The operator is also assured that the centerline of the aperture 10 of the part is within predetermined limits of a given position radially of the centerline of the article.

The species shown in Figs. 5 to 8, inclusive, utilizes the inner unit 33. To simplify the description of this species, the reference numerals identifying the various portions of the inner unit 33 in Figs. 1 and 2 are employed to identify the same structure shown in Fig. 5. In this embodiment of the invention at another portion of the article 10, an annular part 55 is mounted in the periphery of the article, that is, within an aperture therein. The relationship of the centerline of an opening 56 of the part 55 with respect to a given radial position in the article, as well as the position of a surface 57, relative to the periphery of the article are the features of the part which are to be gaged. An outer unit 58 includes a body 59 centrally apertured at 60 to receive the bar 43. An annular member 61 is disposed concentric with the body 59 and is loosely positioned thereon, held against displacement by pins 63. A disklike portion 64 has equally spaced apertures 65 therein to receive supporting elements 66, their head portions 67 being of like diameters and thicknesses. Interposed between the apertures 65 and equally spaced therefrom, are bushings 70 mounted in suitable apertures in the member 64. Gaging elements 71 are disposed in their bushings 70 free to move axially distances limited by pins 72 extending laterally through the bushings and positioned within notches 73 of the gaging elements. The upper ends of the gaging elements are formed with high portions 74 and low portions 75 to cooperate with the upper surfaces of their respective bushings to indicate the results of the gaging process. A knurled handle 76 extending vertically from the member 64 is used in moving the unit 58 into and out of gaging position. The head portions 67 of the supporting elements 66 provide positive supports for the portion 64 on the annular member 61 when the unit 58 is not in gaging position to eliminate excess wear on the gaging elements 71.

When gaging the part 55 to determine whether or not the surface 57 is within predetermined limits of a given distance from the periphery of the article 10, the unit 58 without the assistance of the unit 33 is lowered until the element 61 rests upon the surface 57 and until the portion 64 comes to rest upon the periphery of the article, this portion being larger than the aperture or the part 55 so that it will be stopped by and rest on the periphery of the article. At this time the operator observes the gaging elements 71 which are free to move downwardly until they rest upon the upper surface of the element 61. If the upper surfaces of the bushings 70 lie within the planes of the surfaces 74 or 75, or between these planes, the surface 57 is within given limits of the desired position from the periphery of the article.

During the next gaging operation, the unit 33 is moved into position, guided at this time by a lug 80 entering the slot 35, where the bar 43 is in general alignment with the aperture 60 in the body 59. At this time, through the aid of the handle 48, the operator moves the bar into the aperture 60 and secures it in position with the thumb screw 46. The body 59 is, thereby, positioned with its centerline coincident with the given position desired for the centerline of the part 55. The variations of the centerline of the part from the said given position will be indicated by the gaging elements 71. The operator again observes the gaging elements 71 and determines whether or not any one or group of gaging elements are positioned out of limits. If, in order to position the bar 43 in the aperture 60, it has been necessary to tilt the body a distance which would cause any of the gaging elements 71 to be moved so that their gaging surfaces 74 or 75 would be respectively below or above the upper surfaces of their bushings 70, the operator is assured that the centerline of the part 55 is not within the required limits of a given position radially of the centerline of the article 10. However, if the gaging surfaces 74 and 75 of all of the elements are within the required positions with respect to the surfaces of their bushings, although there may be variations in their respective positions, the operator is assured that the part 55 is located sufficiently accurate within the desired limits.

Although specific improvements of the invention have been shown and described, it will be understood that they are but illustrative and that various modifications may be made therein without departing from the scope and spirit of this invention as defined by the appended claims.

What is claimed is:

1. A gage for checking the position of an apertured part, secured to the periphery of a cylindrical article in alignment with an aperture in the article, with respect to a given position radially of the centerline of the article, the gage comprising a unit for mounting in the aperture of the part and having an inwardly extending portion with an aperture therein positioned with its centerline coincident with the centerline of the aperture in the part, a support mounted within the article with its centerline coincident with the centerline of the article, a carriage disposed on the support and having an aperture therein, the centerline of which is in the said given position, and a gage bar partially projecting into the aperture of the carriage and movable longitudinally thereof where it will be receivable in the aperture of the said portion of the unit if the centerline of the aperture of the part is within predetermined limits of the given position.

2. A gage for checking the centerline of an apertured part with respect to a given radial position in an article, circular in cross-section, in which the part is mounted and the distance of a surface of the part from the periphery of the article, the gage comprising an outer unit having a body with an aperture therein, a member disposed in engagement with the said surface of the part to cause the centerline of the aperture in the body to assume a position coincident with the centerline of the aperture of the part, and means cooperating with the member to indicate whether or not the said surface of the part is within a given distance from the periphery of the article, a support mounted within the article with its centerline coincident with the centerline of the article, and an inner unit mounted on the support and having a bar movable in a given path radially of the centerline of the article to enter the aperture in the said body of the outer unit if the centerline of the part is within predetermined limits of a given radial position relative to the centerline of the article.

3. A gage for checking the centerline of an apertured part with respect to a given radial position in an article, circular in cross-section, in which the part is mounted and the distance of a surface of the part from the periphery of the article, the gage comprising an outer unit having a body with an aperture therein, a member disposed in engagement with the said surface of the part to cause the centerline of the aperture in the body to assume a position co-incident with the centerline of the aperture of the part, means cooperating with the member to indicate whether or not the said surface of the part is within a given distance from the periphery of the article, a support mounted within the article with its centerline coincident with the centerline of the article, an inner unit mounted on the support and having a bar movable in a given path radially of the centerline of the article to enter the aperture in the said body of the outer unit if the centerline of the part is within predetermined limits of a given radial position relative to the centerline of the article, and means for use in moving the bar.

4. A gage for checking the centerline of an apertured part with respect to a given radial position in an article, circular in cross-section, in which the part is mounted and the distance of a surface of the part from the periphery of the article, the gage comprising an outer unit having a body with an aperture therein, a member disposed in engagement with the said surface of the part to cause the centerline of the aperture in the body to assume a position coincident with the centerline of the aperture of the part, means cooperating with the member to indicate whether or not the said surface of the part is within a given distance from the periphery of the article, a support mounted within the article with its centerline coincident with the centerline of the article, an inner unit mounted on the support and having a bar movable in a given path radially of the centering of the article to enter the aperture in the said body of the outer unit if the centerline of the part is within predetermined limits of a given radial position relative to the centerline of the article, means for use in moving the bar, and means to lock the bar in any selected position.

5. A gage for checking the distance of a surface of an apertured part from the periphery of a cylindrical article in which the part is mounted adjacent an aligned aperture in the article, the gage comprising a body having a member to engage the said surface of the part and a projection having an indicating portion to extend through and beyond the apertures in the part and article a distance limited by the member engaging the said surface, a spacing element disposed concentric with the projection and resting tangentially on the article, and a gaging element movable on the projection a distance limited by the spacing element to cooperate with the indicating portion to indicate whether or not the said surface is within predetermined limits of a given distance from the periphery of the article.

6. A gage for checking the distance of a surface of a part from the periphery of a cylindrical article in which the part is mounted adjacent an aligned aperture in the article, the gage comprising a member positioned to rest on the part having parallel sides one of which lies on the said surface while the other is spaced a known distance therefrom, a support positioned to rest upon the periphery of the article adjacent the member, a gaging element carried by the support and movable to engage the said other side of the member to indicate whether or not the said surface is within predetermined limits of a given distance from the periphery of the article, and means to hold the support with its centerline in a given position radially of the centerline of the article, whereby the said gaging element will indicate any variation of the centerline of the part from the said given radial position.

7. A gage for checking the distance of a surface of a part from the periphery of a cylindrical article in which the part is mounted adjacent an aligned aperture of the article, the gage comprising a member positioned to rest on the part having parallel sides one of which lies on the said surface while the other is spaced a known distance therefrom, a support positioned to rest upon the periphery of the article adjacent the member and having apertures therein, and gaging elements disposed in spaced positions in apertures of the support and movable to engage the said other side of the member to jointly indicate whether or not the said surface of the part is within predetermined limits of a given distance from the periphery of the article.

EARL C. MOSS.

REFERENCES CITED

The following references are of record in the file of this patent:

UNITED STATES PATENTS

| Number | Name | Date |
|---|---|---|
| 785,739 | Kettnich | Mar. 28, 1905 |
| 799,533 | Clark | Sept. 12, 1905 |
| 825,648 | Haworth | July 10, 1906 |
| 851,507 | Fetherolf | Apr. 20, 1907 |
| 945,515 | Golding | Jan. 4, 1910 |
| 1,472,195 | Schlaupitz | Oct. 30, 1923 |
| 1,526,418 | Gronner | Feb. 17, 1925 |
| 1,687,723 | Goodsell | Oct. 16, 1928 |
| 1,942,118 | Pignone | Jan. 2, 1934 |
| 2,124,603 | Banett | Jan. 26, 1938 |
| 2,224,728 | Gulliksen | Dec. 10, 1940 |
| 2,238,887 | King | Apr. 22, 1941 |
| 2,412,569 | Dugger | Dec. 17, 1946 |
| 2,565,140 | Leustig | Aug. 21, 1951 |

FOREIGN PATENTS

| Number | Country | Date |
|---|---|---|
| 371,239 | Italy | May 16, 1939 |

OTHER REFERENCES

American Machinist page 26, January 1, 1931; ibid., page 125, January 3, 1946; ibid., page 130, February 14, 1946.